US009799458B2

(12) United States Patent
Isii (10) Patent No.: US 9,799,458 B2
(45) Date of Patent: Oct. 24, 2017

(54) ELECTRODE FOR CAPACITOR AND CAPACITOR USING SAME (71) Applicant: Panasonic Intellectual Property Management Co., Ltd., Osaka (JP)

(72) Inventor: Kiyohiro Isii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 245 days.

(21) Appl. No.: 14/430,512

(22) PCT Filed: Sep. 11, 2013

(86) PCT No.: PCT/JP2013/005376
§ 371 (c)(1),
(2) Date: Mar. 23, 2015

(87) PCT Pub. No.: WO2014/049991
PCT Pub. Date: Apr. 3, 2014

(65) Prior Publication Data
US 2015/0248971 A1   Sep. 3, 2015

(30) Foreign Application Priority Data

Sep. 28, 2012   (JP) .................................. 2012-215883

(51) Int. Cl.
*H01G 9/00*   (2006.01)
*H01G 9/04*   (2006.01)
(Continued)

(52) U.S. Cl.
CPC ............ *H01G 11/32* (2013.01); *H01G 11/06* (2013.01); *H01G 11/24* (2013.01); *H01G 11/66* (2013.01); *Y02E 60/13* (2013.01); *Y02T 10/7022* (2013.01)

(58) Field of Classification Search
CPC .......... H01G 9/00; H01G 9/155; H01G 11/32; H01G 11/42; H01G 11/66
USPC .......................... 361/502, 503, 508; 252/502
See application file for complete search history.

(56) References Cited

U.S. PATENT DOCUMENTS 6,432,585 B1   8/2002   Kawakami et al.
2010/0015514 A1   1/2010   Miyagi et al.
(Continued)

FOREIGN PATENT DOCUMENTS

CN   101292389   10/2008
JP   11-242954   9/1999
(Continued)

OTHER PUBLICATIONS

International Search Report of PCT application No. PCT/JP2013/005376 dated Dec. 10, 2013.
(Continued)

*Primary Examiner* — Eric Thomas
*Assistant Examiner* — Arun Ramaswamy
(74) *Attorney, Agent, or Firm* — McDermott Will & Emery LLP (57) ABSTRACT A capacitor electrode includes a collector, and an electrode layer disposed in contact with the collector and capable of inserting and releasing cations. The electrode layer includes first carbon material particles capable of inserting and releasing cations and second carbon material particles capable of inserting and releasing cations. The average particle diameter of primary particles of the second carbon material particles is smaller than the average particle diameter of primary particles of the first carbon material particles. In the electrode layer, the content amount of the second carbon material particles is smaller than the content amount of the first carbon material particles.

20 Claims, 4 Drawing Sheets

(51) Int. Cl.
*H01G 9/145* (2006.01)
*H01B 1/04* (2006.01)
*H01G 11/32* (2013.01)
*H01G 11/06* (2013.01)
*H01G 11/24* (2013.01)
*H01G 11/66* (2013.01)

(56) References Cited

U.S. PATENT DOCUMENTS

| | | | | |
|---|---|---|---|---|
| 2012/0050950 A1* | 3/2012 | Kim | ............ | H01G 11/50 |
| | | | | 361/505 |
| 2012/0050952 A1* | 3/2012 | Choi | ............ | B82Y 30/00 |
| | | | | 361/508 |
| 2012/0183860 A1* | 7/2012 | Naoi | ............ | H01G 11/24 |
| | | | | 429/231.8 |

FOREIGN PATENT DOCUMENTS

| | | |
|---|---|---|
| JP | 2007-067105 | 3/2007 |
| JP | 2010-049873 | 3/2010 |
| JP | 2010-157564 | 7/2010 |
| JP | 2011-204704 | 10/2011 |
| JP | 2012-054552 | 3/2012 |
| WO | 2010/016567 | 2/2010 |

OTHER PUBLICATIONS

English Translation of Chinese Search Report dated Nov. 30, 2016 for the related Chinese Patent Application No. 201380049971.9.

\* cited by examiner

ELECTRODE FOR CAPACITOR AND CAPACITOR USING SAME

TECHNICAL FIELD

The present invention relates to a capacitor used in various electronic devices, for backup power supply or regeneration in a hybrid vehicle or fuel cell vehicle, for electric power storage, or the like, and relates to an electrode used for the capacitor.

BACKGROUND ART

When an electronic device operates, the energy necessary for the operation is taken in the electronic device. However, it is difficult to consume all the energy taken in for the operation of the electronic device, and part of the energy is consumed without achieving the intended purpose, as thermal energy, for example. It is studied that the consumed energy is reduced to enhance efficiency in the following method. The energy to be consumed is stored once, as electric energy in an electric storage element and the stored energy is reused when necessary.

This method requires an electric storage device capable of supplying the energy necessary for the operation of an electronic device with suitable output. Examples of the electric storage device include a capacitor and a secondary battery. Particularly among them, an electric double layer capacitor having a large capacitance, capable of rapidly charging and discharging, and having high long-term reliability draws attention and is used in many fields.

An electric double layer capacitor has polarizable electrodes mainly made of activated carbon, as a positive electrode and a negative electrode. The withstand voltage of the electric double layer capacitor is 1.2 V when an aqueous electrolytic solution is used, and is 2.5 to 3.3 V when an organic electrolytic solution is used.

However, the energy density of an electric double layer capacitor is smaller than that of a secondary battery. The energy density is proportional to a capacitance and the square of a voltage. Thus, in order to increase the energy density of an electric double layer capacitor, it is necessary to increase at least one of these elements.

In order to increase the voltage of a capacitor, the following proposal is made. By causing the carbon material of the negative electrode to insert (pre-dope) lithium ions, the electric potential of the negative electrode is lowered. Such a capacitor includes the following elements: a negative electrode having inserted lithium ions; a positive electrode as a polarizable electrode; and an electrolytic solution impregnated into the positive electrode and the negative electrode and including a lithium salt. This capacitor is charged and discharged within the range in which lithium ions pre-doped to the negative electrode are not released completely.

Figure 4A:
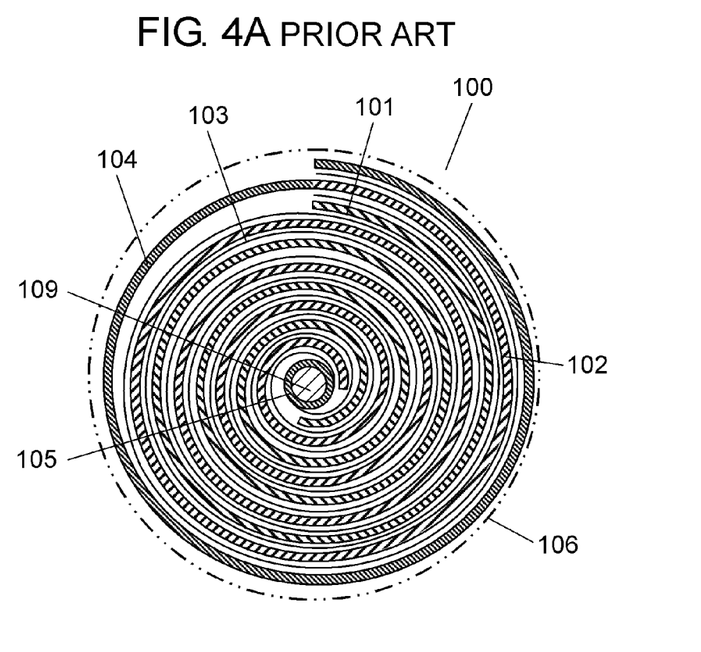
FIG. 4A is a horizontal sectional view of a conventional capacitor.
Figure 4B:
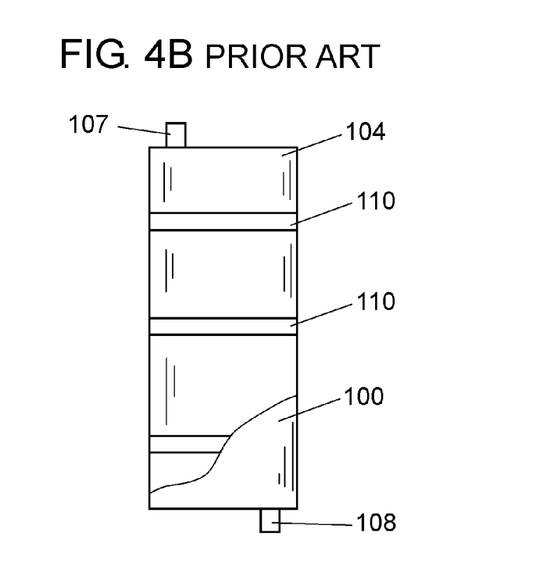
FIG. 4B is a partially cutaway front view of an electrode wound unit of the capacitor shown in FIG. 4A.

FIG. 4A is a top sectional view of a capacitor including lithium ions as cations, shown as an example of a conventional capacitor. FIG. 4B is a partially cutaway front view of electrode wound unit 100 in this capacitor.

As shown in FIG. 4A, this capacitor includes electrode wound unit 100. Electrode wound unit 100 is formed by laminating positive electrode 101 and negative electrode 102 with separator 103 interposed therebetween and winding the laminate in a concentric configuration. As the lithium supply sources, lithium metals (lithium electrodes) 104 and 105 are disposed along the outer periphery and at the center of electrode wound unit 100, respectively. Lithium metal 105 formed at the winding center is supported by rod 109. Rod 109 also serves as an axial rod for supporting electrode wound unit 100. The capacitor is configured so that these elements are housed in case 106 made of aluminum or iron and an electrolytic solution fills the inside.

Each of positive electrode 101 and negative electrode 102 includes a collector (not shown) made of a porous material having holes through the front and back faces. The collector is thus made of a porous material. Therefore, even when lithium metals 104 and 105 are disposed along the outer periphery and at the center of electrode wound unit 100, lithium ions can freely move from lithium metals 104 and 105 between the respective electrodes through the through-holes of the collectors of electrode wound unit 100. As a result, lithium ions can be pre-doped to the whole of negative electrode 102 in advance.

As shown in FIG. 4B, electrode terminals 107 and 108 are connected to positive electrode 101 and negative electrode 102, respectively. Electrode terminals 107 and 108 are led out in the directions opposite to each other along the winding axial direction of cylindrical electrode wound unit 100. Lithium metal 105 formed at the winding center is supported by rod 109. Rod 109 also works as the axial rod for supporting electrode wound unit 100. The outermost circumference of electrode wound unit 100 is fixed by tapes 110 so that the wound shape is maintained. Such a capacitor is disclosed in Patent Literature 1, for example.

CITATION LIST

Patent Literature

PTL1: Japanese Patent Unexamined Publication No. 2007-067105

SUMMARY OF THE INVENTION

The present invention provides a capacitor electrode having a lower resistance, and a capacitor including the capacitor electrode. The capacitor electrode of the present invention includes a collector, and an electrode layer disposed in contact with the collector and capable of inserting and releasing cations. The electrode layer includes first carbon material particles capable of inserting and releasing cations and second carbon material particles capable of inserting and releasing cations. The average particle diameter of primary particles of the second carbon material particles is smaller than the average particle diameter of primary particles of the first carbon material particles. In the electrode layer, the content amount of the second carbon material particles is smaller than the content amount of the first carbon material particles.

The above configuration allows the second carbon material particles to be disposed in the gaps formed between the first carbon material particles. This increases the surface area capable of making contact with the electrolytic solution, as the electrode layer, thus allowing insertion of more lithium ions at a time. As a result, when the electrode of the present invention is used as a negative electrode of a capacitor, the amount of lithium doped to the negative electrode per unit time is increased, and the resistance of the capacitor can be reduced.

DESCRIPTION OF EMBODIMENT

As described above, in the conventional capacitor shown in FIG. 4A, lithium ion supply sources are provided in two positions, i.e. along the outer periphery and at the center of electrode wound unit 100. This configuration allows lithium ions to be doped to negative electrode 102 faster than the method for supplying and doping lithium ions from one lithium ion supply source. Thus, pre-doping can be completed in a shorter time period. However, the negative electrode of such a capacitor needs to have a lower resistance so that the capacitor can be charged and discharged rapidly.

Figure 1:
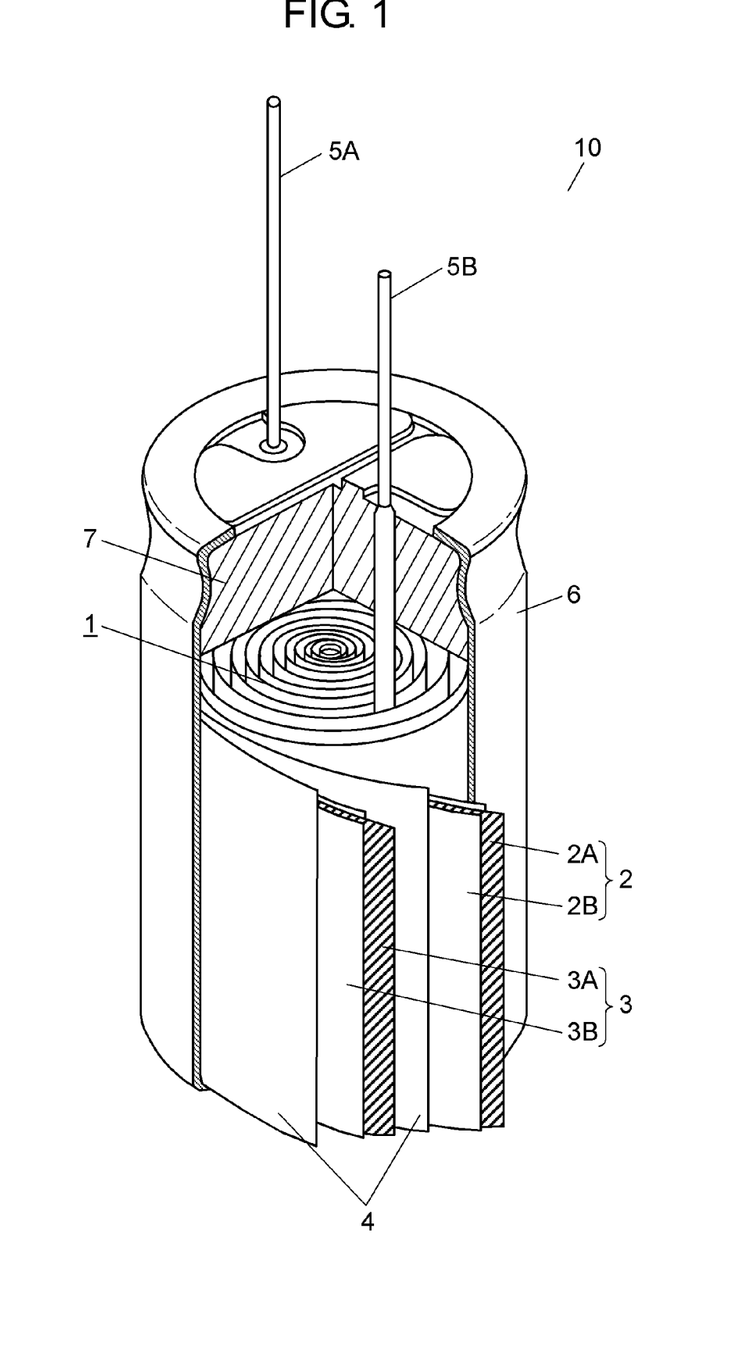
FIG. 1 is a partially cutaway perspective view of a capacitor in accordance with an exemplary embodiment of the present invention.

Hereinafter, a description is provided for capacitor 10 and an electrode therefor (negative electrode 3) in accordance with an exemplary embodiment of the present invention. FIG. 1 is a partially cutaway perspective view of capacitor 10. Capacitor 10 includes capacitor element (hereinafter being referred to as an element) 1, an electrolytic solution (not shown) that contains an electrolyte composed of cations and anions and is impregnated into element 1, and bottomed cylindrical case 6 accommodating element 1 and the electrolytic solution therein.

Element 1 includes positive electrode 2, negative electrode 3, and separator 4. Separator 4 is interposed between positive electrode 2 and negative electrode 3. Positive electrode 2 includes collector 2A as a first collector having electrical conductivity, and electrode layer 2B as a first electrode layer formed on the surface of collector 2A. Negative electrode 3 includes collector 3A as a second collector having electrical conductivity, and electrode layer 3B as a second electrode layer formed on the surface of collector 3A. Electrode layer 2B is capable of absorbing and desorbing anions constituting the electrolyte. Electrode layer 3B has cations constituting the electrolyte to be inserted therein.

Collector 2A is formed of aluminum, for example. Collector 3A is formed of copper, for example. Electrode layer 2B is a polarizable electrode layer that contains activated carbon for absorbing and desorbing anions. Electrode layer 3B is mainly formed of carbon material and inserts lithium ions as cations. Referring to FIG. 1, element 1 is configured so that separator 4 is interposed between positive electrode 2 and negative electrode 3 and these elements are wound together. However, the present invention is not limited to this configuration, and the following configuration may be used. For instance, positive electrode 2 and negative electrode 3 both in a planar shape are laminated with separator 4 interposed therebetween.

Lead wires 5A and 5B are connected to the surfaces of positive electrode 2 and negative electrode 3, respectively, as electrode leading-out terminals. Sealing member 7 seals the open end of case 6 so that lead wires 5A and 5B are exposed.

Next, a method for fabricating the capacitor is described. The following fabricating method is an example for implementing the configuration of the present invention. The present invention is not limited to the following fabricating method.

First, a description is provided for the procedure for fabricating positive electrode 2. As collector 2A, a high-purity aluminum foil (with a purity of 99% or higher) having a thickness of approximately 15 μm, for example, is used. This aluminum foil undergoes electrolytic etching in a chlorine-based etchant so that the surface of the foil is roughened. Electrode layer 2B is formed on each of the front and back faces of collector 2A whose surface is thus roughened. Examples of the material constituting electrode layer 2B include activated carbon, a binder, and a conductive auxiliary agent.

As the activated carbon, coke activated carbon having an average particle diameter of approximately 3 μm is used. As the binder, a liquid dispersion in which polytetrafluoroethylene (PTFE) is dispersed in water is used. As the conductive auxiliary agent, acetylene black is used. The mixing ratio by weight between the activated carbon, the binder, and the conductive auxiliary agent is 10:2:1, for example. This mixture is kneaded using a kneader and adjusted to have a predetermined viscosity. In kneading, carboxymethylcellulose (CMC), for example, is added as a dispersant.

The paste thus prepared is applied to the front and back faces of collector 2A and dried in an atmosphere of air at a temperature of 100° C. Thus, polarizable electrode layer 2B is formed. The thickness of electrode layer 2B is 40 μm, for example. Thereafter, collector 2A including electrode layers 2B is slit so as to have a predetermined width.

Further, parts of electrode layers 2B formed on the front and back faces of collector 2A are removed. Lead wire 5A formed of aluminum, for example, is connected to a part where collector 2A is exposed by needle-caulking or other methods. Thus, positive electrode 2 is completed.

Figure 2:
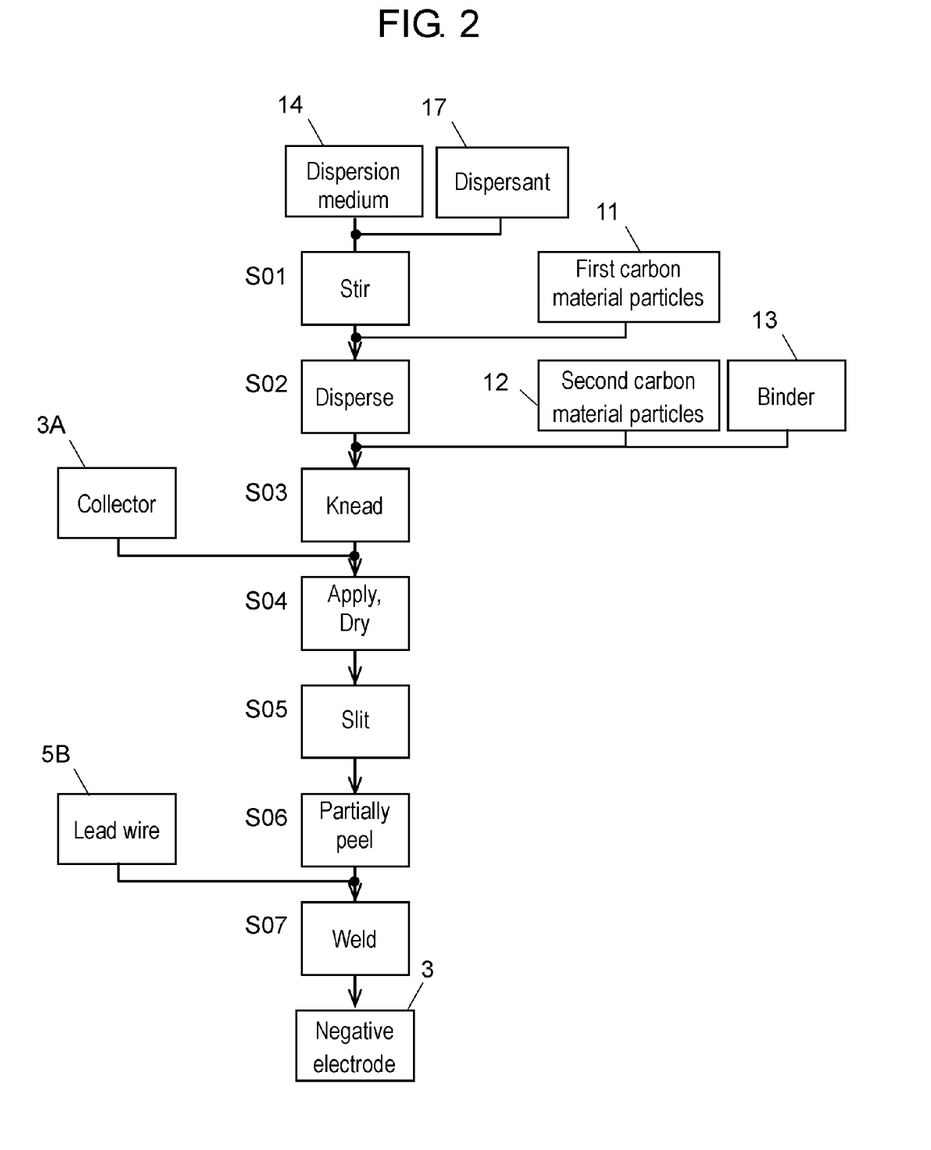
FIG. 2 is a flowchart showing a procedure for fabricating a negative electrode of the capacitor shown in FIG. 1.

Next, a description is provided for the procedure for fabricating negative electrode 3 with reference to FIG. 2. As collector 3A, a copper foil having a thickness of approximately 15 μm, for example, is used. Electrode layer 3B is formed on each of the front and back faces of the copper foil. As the materials constituting each electrode layer 3B, hard carbon that includes primary particles having an average particle diameter of 9 μm is used as first carbon material particles 11 capable of reversibly inserting and releasing lithium ions. As second carbon material particles 12, thermal black that includes primary particles having an average particle diameter in the range of 350 nm to 500 nm is used. As binder 13, a styrene-butadiene rubber (SBR), a kind of rubber binder, is used.

In this exemplary embodiment, the average particle diameter means $D_{50}$ (median diameter). A particle diameter means an effective diameter in optical characteristics. In the following description, the average particle diameter of the primary particles is simply referred to as a particle diameter.

A paste is prepared in the following steps. CMC as dispersant 17 is put into water as dispersion medium 14 and stirred, so that a CMC aqueous solution is prepared (S01). First carbon material particles 11 are put into this CMC aqueous solution so as to be dispersed in the CMC aqueous solution (S02). Thereafter, second carbon material particles 12 and binder 13 are put in, stirred, and kneaded, so that the paste to be used for negative electrode 3 is prepared (S03). To make the paste have a viscosity suitable for application, dispersion medium 14 may be added if necessary.

This paste is applied to the front and back faces of collector 3A using a comma coater, a die coater, or the like, and dried in the air at a temperature of 80° C., so that electrode layers 3B are formed (S04). Collector 3A having electrode layer 3B formed on each of the front and back faces is slit so as to have a predetermined width (S05).

Further, similarly to positive electrode 2, parts of electrode layers 3B formed on each surface of collector 3A are removed (S06). Lead wire 5B formed of copper, for example, is connected to the portion where collector 3A is exposed by resistance welding, for example (S07). With the above steps, negative electrode 3 before pre-doping is completed.

Besides hard carbon (non-graphitizable carbon), graphitized carbon, soft carbon (graphitizable carbon), and low-temperature calcined carbon or the like can be used as first carbon material particles 11.

Unlike positive electrode 2, lithium ions need to be inserted into the carbon material of negative electrode 3 by pre-doping. Then, next, as the lithium supplying step, a lithium layer (not shown) containing cation atoms, as a doping source, is disposed in case 6. This lithium layer is ionized in a solvent and ionized lithium is intercalated in each electrode layer 3B of negative electrode 3. Thus, the lithium layer can be disposed in any position where the lithium layer can make contact with the electrolytic solution in case 6. For instance, the lithium layer may be disposed on the inner bottom face of case 6. This pre-doping step will be detailed later.

Next, a description is provided for the procedure for fabricating element 1. Positive electrode 2 is disposed opposite negative electrode 3 and separator 4 is interposed between positive electrode 2 and negative electrode 3, so that a laminate is formed. Separator 4 is a sheet of cellulose paper, for example. This laminate is wound so that separator 4 is interposed between positive electrode 2 and negative electrode 3 opposite each other. Thus, element 1 is completed.

Next, a description is provided for the procedure for housing element 1 and the electrolytic solution in case 6. As the electrolytic solution, the following solution, for example, is used. The electrolyte contains lithium ions as cations, and anions containing fluorine atoms in consideration of withstand voltage characteristics as anions. This electrolyte is dissolved in a solvent. As the above anions, $BF_4^-$ or $PF_6^-$ is preferable. As the solvent, a mixed solvent is used in which ethylene carbonate (EC) having a high dielectric constant and dimethyl carbonate (DMC) having a low viscosity are mixed at a weight ratio of 1:1. The electrolytic solution is not limited to the above and those containing lithium ions exert the similar effects. The composition and the effects of the electrolytic solution will be described later.

Case 6 is formed of a metal, such as iron, aluminum, copper, and nickel, in terms of heat dissipation. However, any material less likely to react with the electrolytic solution can be used. The case may be a prism case or a laminate type bag (envelop).

In capacitor 10, lithium ions are pre-doped to negative electrode 3 when the electrolytic solution containing lithium ions and element 1 are housed in case 6.

Here, a description is provided for pre-doping performed on negative electrode 3 that constitutes element 1. Pre-doping is a treatment in which a predetermined amount of lithium ions are inserted into negative electrode 3 in advance before capacitor 10 is charged and discharged after actual fabrication. The insertion represents a phenomenon in which lithium ions in the vicinity of negative electrode 3 enter between the layers of layer crystal structures of each of first carbon material particles 11 and second carbon material particles 12 and an intercalation compound composed of carbon atoms and lithium atoms is formed.

When lithium ions are thus inserted into negative electrode 3, the electric potential of negative electrode 3 is lowered by the electrochemical reaction of lithium ions. As a result, the difference in electric potential between positive electrode 2 and negative electrode 3 for use in the capacitor increases, and thereby the energy density of the capacitor is enhanced.

These lithium ions enter between the layers of the layer crystal structures of each of first carbon material particles 11 and second carbon material particles 12, and form an alloy composed of lithium and carbon, with electrons supplied from the lithium layer to negative electrode 3. Thus, lithium is inserted into the carbon materials of negative electrode 3 and the electric potential of negative electrode 3 drops.

By impregnating the electrolytic solution into negative electrode 3 for a predetermined time period, the metal lithium in the lithium layer is inserted into the carbon materials. Thus, the pre-doping step is completed.

Also in the field of a lithium ion secondary battery, lithium ions are pre-doped to the negative electrode. However, pre-doping in the lithium ion secondary battery is intended to enhance the charge/discharge capacity by reducing the irreversible capacity of the negative electrode in the charge/discharge cycle. The purpose and action of pre-doping in the secondary battery are different from those in the capacitor. The purpose of the pre-doping in the capacitor is to increase the voltage (enlarge the potential window) of the capacitor by lowering the electric potential of negative electrode 3. Depending on such a difference in purpose, the amount of lithium ions to be inserted in pre-doping is different. The amount of lithium ions inserted in the lithium ion secondary battery only needs to correspond to the amount of irreversible capacity of the negative electrode, and is obviously smaller than the amount of lithium ions inserted in the capacitor.

Next, a description is provided for the sealing procedure. First, lead wires 5A and 5B projecting from element 1 are threaded through the through-holes formed through sealing member 7. In this state, element 1 is inserted into case 6 and sealing member 7 is disposed in the opening of case 6. Then, case 6 is drawn from the outer circumferential face in the vicinity of the opening of case 6 where sealing member 7 is positioned, toward the inside of case 6. On the open end of case 6, case 6 is curled. Thus, sealing member 7 is fixed so as to be compressed. With the above procedure, sealing of the opening of case 6 is completed.

At last, for quality maintenance, capacitor 10 thus assembled is aged and the electrical initial operation is confirmed. Thus, capacitor 10 is completed.

Here, a description is provided for the composition of the electrolytic solution. In the above description, a mixed solvent of EC and DMC is used with $LiBF_4$ or $LiPF_6$ as a supporting salt (solute). However, the solute is not limited to the above. The mixture of two or more types of anions expressed by the following chemical formulas is also useful. That is, it is preferable to use the mixture of two or more types of anions among $PF_6^-$, $BF_4^-$, $P(CF_3)xF_6^{X-}$ ($1 \leq X \leq 6$), and $B(CF_3)_yF_4^{Y-}$ ($1 \leq Y \leq 4$) ($CF_3$ may be replaced with a chain fluorocarbon such as $C_2F_5$ or cyclic fluorocarbon).

In the cell capacitance and resistance of capacitor 10, the capacitance and resistance of positive electrode 2 are also important. The active material of positive electrode 2 is activated carbon as described above. The diameters of pores of the activated carbon are not uniform. That is, the pore diameters have a given distribution, and an optimum range is present in the pore diameters of the activated carbon for a certain anion diameter and in an opposite manner, an optimum range is present in the anion diameters for a certain pore diameter of the activated carbon. Thus, anions having a plurality of types of anion diameters are absorbed into and released from the activated carbon formed with pores having a plurality of types of diameters. Thereby, the capacitance can be made larger than that when the activated carbon of positive electrode 2 and a single type of anion are used.

The capacitance of the activated carbon becomes effective when lithium ions are absorbed, in the case where the positive electrode electric potential is equal to or lower than 3.0 V (with respect to $Li/Li^+$ electric potential). At this time, lithium ions are solvated, but the state of solvation varies depending on the type of anion.

That is, changing the diameter in the state where lithium ions are solvated can positively increase the capacitance of the activated carbon of the positive electrode when the positive electrode electric potential is equal to or lower than 3.0 V (with respect to $Li/Li^+$ electric potential).

This phenomenon is peculiar to a capacitor as shown in this exemplary embodiment where carbon materials pre-doped with lithium ions are used for the negative electrode and a polarizable electrode is formed of activated carbon as the positive electrode.

It is preferable that anions contained in the electrolyte have a higher withstand voltage. That is, as a single type of anion, $PF_6^-$ has a relatively high withstand voltage and is preferable. Thus, it is more preferable that the combination of the above anions include $PF_6^-$.

The reason why the withstand voltage increases as described above is presumed as follows. In order to suppress corrosion of aluminum constituting collector 2A, a film mainly made of aluminum fluoride needs to be formed on the surfaces of collector 2A in advance. $PF_6^-$ can effectively supply $F^-$ to the surfaces of aluminum, and thus a capacitor containing $PF_6^-$ is considered to have a high withstand voltage. Thus, an aluminum fluoride film can be efficiently formed by electrochemically forming an aluminum film using $PF_6^-$ once and thereafter adding and mixing other anions such as $BF_4^-$.

The aluminum fluoride may be formed on the surfaces of the collector in advance by a treatment in a dry atmosphere, such as a plasma treatment and a gas treatment. Such a method can further increase the withstand voltage. Treating the activated carbon at the same time can increase the capacitance and reduce the resistance, and thus can further increase the substantial withstand voltage. Further, treating positive electrode 2 in such a dry atmosphere allows two or more types of anions to be treated at the same time in the electrolytic solution. This offers an advantage of considerably increasing the productivity.

As a solvent for the above electrolyte, two or more types can be selected appropriately from the following organic solvents: a mixture of cyclic or chain carbonate, such as propylene carbonate, ethylene carbonate, gamma butyrolactone, sulfolane, ethyl methyl carbonate, dimethyl carbonate, diethyl carbonate and butylene carbonate; and organic solvents containing cyclic ester, chain ester, cyclic ether, and chain ether; and organic solvents having an epoxy group, sulfone group, vinyl group, carbonyl group, amide group, or cyano group.

Next, negative electrode 3 is detailed. Negative electrode 3 of capacitor 10 of this exemplary embodiment includes collector 3A and electrode layer 3B disposed in contact with collector 3A and capable of inserting and releasing cations. Electrode layer 3B includes first carbon material particles 11 and second carbon material particles 12. First carbon material particles 11 and second carbon material particles 12 are capable of inserting and releasing cations. The particle diameter of second carbon material particles 12 is smaller than that of first carbon material particles 11. In electrode layer 3B, the content amount of second carbon material particles 12 is smaller than that of first carbon material particles 11.

With the above configuration, second carbon material particles 12 are disposed in the gaps formed among first carbon material particles 11. This increases the surface capable of reacting with lithium ions in electrode layer 3B, thus reducing the resistance in negative electrode 3 in charging and discharging.

In order to satisfy the above positional relation between the carbon material particles, in this exemplary embodiment, electrode layer 3B includes first carbon material particles 11 having a large particle diameter, as a primary material having a large content amount; and second carbon material particles 12 having a small particle diameter, as a secondary material having a small content amount. It is preferable that first carbon material particles 11 have a particle diameter ranging from approximately 1 to 10 μm (e.g. approximately 9 μm) in order to form electrode layer 3B having a thickness of approximately several tens micrometers.

Figure 3:
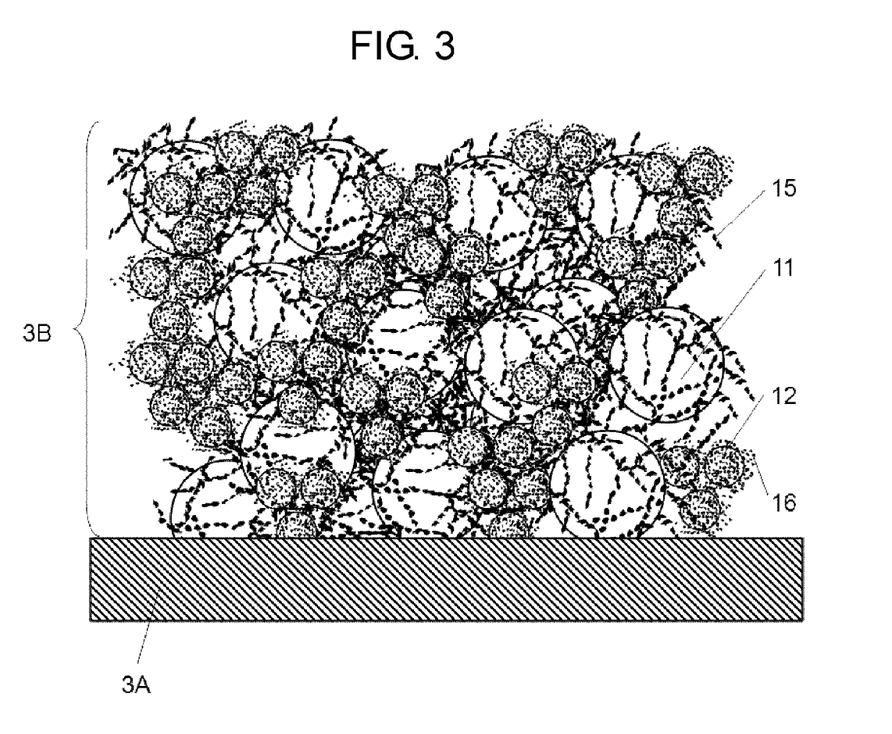
FIG. 3 is a schematic cross-sectional view of the capacitor shown in FIG. 1.

The particle diameter of second carbon material particles 12, which ranges from 350 nm to 500 nm, is smaller than the particle diameter of first carbon material particles 11. Second carbon material particles 12 easily aggregate before forming electrode layer 3B because they are small. Thus, it is preferable to use a plurality of dispersants having different molecular weights from each other in electrode layer 3B so that the particles can be more uniformly dispersed in electrode layer 3B. Electrode layer 3B thus configured is described with reference to FIG. 3. FIG. 3 is a schematic cross-sectional view of electrode 3. Electrode layer 3B includes first carbon material particles 11 having a large particle diameter, second carbon material particles 12 having a smaller particle diameter, first dispersant 15 having a relatively large molecular weight, and second dispersant 16 having a relatively small molecular weight. For simplicity, binder 13 is not shown.

Preferably, the molecular weight of first dispersant 15 ranges from 500000 to 300000, for example, and the molecular weight of second dispersant 16 ranges from 5000 to 20000, inclusive. First dispersant 15 and second dispersant 16 are both CMC, for example. However, any dispersant having a cellulose framework may be used. That is, each of first dispersant 15 and second dispersant 16 only needs to be cellulose or a derivative thereof. When the content amount of second dispersant 16 is smaller than the content amount of first dispersant 15 in electrode layer 3B, the dispersibility is enhanced.

When two types of dispersants are used as described above, the following steps are performed. In place of dispersant 17 of FIG. 2, first dispersant 15 is used. Before kneading in S03, second carbon material particles 12 are dispersed in an aqueous solution of second dispersant 16 and mixed with the liquid dispersion of first carbon material particles 11 along with binder 13. More specifically, second carbon material particles 12, second dispersant 16, and water are input into a shaker along with zirconia beads each having a diameter of 3 mm, and the shaker is shaken. Thus, the liquid dispersion of second carbon material particles 12 is prepared. Then, while first carbon material particles 11 are dispersed in the aqueous solution of first dispersant 15 using a planetary mixer, the liquid dispersion is put into the planetary mixer.

In this manner, first carbon material particles 11 are dispersed using first dispersant 15, and second carbon material particles 12 are dispersed using second dispersant 16. Thus, it is considered that a larger amount of first dispersant 15 is present in the vicinity of first carbon material particles 11 and a larger amount of second dispersant 16 is present in the vicinity of second carbon material particles 12.

Preferably, in each of second carbon material particles 12, the value obtained by dividing the crystalline size by the interlayer distance is equal to or larger than 12 and the true density is equal to or smaller than 2.11 g/cm$^3$. The value obtained by dividing the crystalline size by the interlayer distance corresponds to the number of interlayer portions in which lithium ions can be intercalated per unit crystalline. At a value exceeding 12, the resistance of second carbon material particles 12 as soft carbon (thermal black) is small. At a true density of 2.11 g/cm$^3$ or smaller, the capacitance as second carbon material particles 12 can be ensured. In order to obtain second carbon material particles 12 satisfying these conditions, thermal black is fired at 1600° C., in an inert gas, for 1 to 50 hours. Thus, second carbon material particles 12 having a particle diameter ranging from 350 nm to 500 nm inclusive are prepared. Preferably, each of second carbon material particles 12 has a crystalline structure having interlayers. In addition to soft carbon, graphite material can be used.

As the thermal energy applied by firing increases, the above value obtained by dividing the crystalline size by the interlayer distance increases, and the resistance is lowered. Thus, it is difficult to set the upper limit of this value. In place of the upper limit of this value, the value of true density is used as the upper limit. As the thermal energy applied by firing increases, the value of true density increases. However, when the true density becomes too large, the capacitance may be decreased as described above. Thus, the value of true density can be used as the upper limit.

Further, it is preferable that the content amount of second carbon material particles 12 with respect to electrode layer 3B exceeds 0 wt % and is equal to or smaller than 40 wt %. Further, it is preferable that surface roughness Rz of electrode layer 3B is equal to or larger than 5 μm. Forming electrode layer 3B without pressing can suppress cracks in electrode layer 3B and peeling thereof from collector 3A. As a result, the surface of the electrode layer is kept rough as shown by the above value. In contrast, when the content amount of second carbon material particles 12 exceeds 40 wt %, electrode layer 3B is likely to peel off from collector 3A, and surface roughness Rz of electrode layer 3B becomes smaller than 5 μm. When first carbon material particles 11 having a particle diameter ranging from 1 μm to 10 μm, inclusive, are used, surface roughness Rz of electrode layer 3B becomes substantially equal to or smaller than 10 μm.

(Performance Evaluation Test)

Hereinafter, a description is provided for a characteristic test of specific examples of the capacitor according to this exemplary embodiment.

In the following examples, hard carbon having a particle diameter of 9 μm is used as first carbon material particles 11, and thermal black having a particle diameter of 400 nm is used as second carbon material particles 12. SBR is used as a binder. When these materials are mixed, the weight ratio between first carbon material particles 11, second carbon material particles 12, and binder 13 is 95:40:1 in sample A, and is 95:17:1 in sample B.

As first dispersant 15, CMC having a molecular weight of approximately 330000 is used. As second dispersant 16, CMC having a molecular weight of approximately 10000 is used. The weight ratio between first dispersant 15 and second dispersant 16 is 2:1. The total amount of CMC is approximately 1% of the weight of first carbon material particles 11.

Each paste is prepared using these materials, applied to the front and back faces of corresponding collector 3A, and dried in the air at 80° C. Thus, electrode layers 3B each having a thickness of approximately 40 μm are formed. The content amount of second carbon material particles 12 in electrode layer 3B is approximately 30 wt % in sample A and is approximately 15 wt % in sample B in accordance with the above mixing ratios.

In sample C, a negative electrode containing no second carbon material particles 12 is used. Similarly to sample A except that no second carbon material particles 12 are used, a model cell of the capacitor is formed.

Positive electrode 2 is formed as described above. The dimensions of each of positive electrode 2 and negative electrode 3 are 2 cm×2 cm. As separator 4, a sheet of cellulose paper having a thickness of approximately 35 μm and a density of 0.45 g/cm$^3$ is used. LiPF$_6$ in an amount of 1.0 mol/l is dissolved in a mixed solvent where EC and DMC are mixed at a ratio of 1:1, and the solution is used as an electrolytic solution. The amount of the electrolytic solution is 15 ml. Positive electrode 2, separator 4, and negative electrode 3 thus formed are laminated, impregnated with the electrolytic solution, and sealed into an aluminum laminate. Thus, a model cell is fabricated. The rating of this model cell is 3.8 V and the dimensions are 4 cm×10 cm×0.35 cm.

For each of the model cells of sample A through sample C, the direct current internal resistance (DC-IR) is measured. The DC-IR is calculated in the following manner. Each capacitor including the negative electrode made of the corresponding sample is charged at 4 V and thereafter is discharged. The intercept when the discharge curve is extrapolated is subtracted from 4 V which is a voltage immediately before the start of discharge, and the obtained value is divided by the current value at discharge. At this time, the range of the discharge curve extrapolated is set to 0.5 to 2 seconds from the start of discharge, for example. The current value at discharge is set to the current value at which each capacitor reaches 2 V in 6 minutes when the capacitor is discharged to 2V.

Table 1 shows rates of decrease of DC-IR of sample A and sample B with respect to sample C for each temperature. The rates of decrease are calculated as a difference between DC-IR of sample C and DC-IR of sample A and a difference between DC-IR of sample C and DC-IR of sample B, with respect to DC-IR of sample C. The temperature conditions in measurement are a room temperature of 25° C. and a low temperature of 0° C.

TABLE 1

| Sample | Rate of decrease of DC-IR % (25° C.) | Rate of decrease of DC-IR % (0° C.) |
|---|---|---|
| A | 24.28 | 65.52 |
| B | 7.25 | 51.26 |

Table 1 shows that DC-IR of each of sample A and sample B is smaller than that of sample C. The table also shows that the effect is remarkable at a low temperature.

As described above, negative electrode 3 is configured so that negative electrode layer 3B has two types of carbon material particles having different particle diameters and the smaller carbon material particles enter the gaps among the larger carbon material particles. This configuration increases the surface area in electrode layer 3B and reduces the resistance as negative electrode 3.

INDUSTRIAL APPLICABILITY

A capacitor including a capacitor electrode of the present invention is excellent in reducing resistance. Thus, the capacitor shows excellent energy density even in rapid charging and discharging. Therefore, the present invention is useful for a hybrid vehicle power supply that is used for regeneration and backup.

The invention claimed is:
1. A capacitor electrode comprising:
a collector; and
an electrode layer disposed in contact with the collector and capable of inserting and releasing cations,
wherein the electrode layer includes:
first carbon material particles capable of inserting and releasing cations; and
second carbon material particles capable of inserting and releasing cations, an average particle diameter of primary particles of the second carbon material particles being smaller than an average particle diameter of primary particles of the first carbon material particles,
in the electrode layer, a content amount of the second carbon material particles is smaller than a content amount of the first carbon material particles,
each of the second carbon material particles has a layered crystal structure, and
a value obtained by dividing a crystalline size by an interlayer distance in each of the second carbon material particles is equal to or larger than 12.
2. The capacitor electrode according to claim 1, wherein:
the first carbon material particles are made of hard carbon, and
the second carbon material particles are made of thermal black.
3. A capacitor electrode comprising:
a collector; and
an electrode layer disposed in contact with the collector and capable of inserting and releasing cations,
wherein the electrode layer includes:
first carbon material particles capable of inserting and releasing cations; and
second carbon material particles capable of inserting and releasing cations, an average particle diameter of primary particles of the second carbon material particles being smaller than an average particle diameter of primary particles of the first carbon material particles,
in the electrode layer, a content amount of the second carbon material particles is smaller than a content amount of the first carbon material particles,
the average particle diameter of the primary particles of the first carbon material particles ranges from 1 μm to 10 μm, inclusive, and
the average particle diameter of the primary particles of the second carbon material particles ranges from 350 nm to 500 nm, inclusive.

4. A capacitor electrode comprising:
a collector; and
an electrode layer disposed in contact with the collector and capable of inserting and releasing cations,
wherein the electrode layer includes:
first carbon material particles capable of inserting and releasing cations; and
second carbon material particles capable of inserting and releasing cations, an average particle diameter of primary particles of the second carbon material particles being smaller than an average particle diameter of primary particles of the first carbon material particles, and
in the electrode layer, a content amount of the second carbon material particles is smaller than a content amount of the first carbon material particles,
wherein the electrode layer further includes:
a first dispersant of cellulose or a derivative thereof; and
a second dispersant of cellulose or a derivative thereof, the second dispersant having a molecular weight smaller than a molecular weight of the first dispersant, and
in the electrode layer, a content amount of the second dispersant is smaller than a content amount of the first dispersant.
5. A capacitor comprising:
a positive electrode capable of absorbing and desorbing anions;
a negative electrode constituted by the capacitor electrode according to claim 1, the negative electrode being disposed opposite to the positive electrode; and
an electrolyte interposed between the positive electrode and the negative electrode.
6. A capacitor comprising:
a positive electrode capable of absorbing and desorbing anions;
a negative electrode constituted by the capacitor electrode according to claim 3, the negative electrode being disposed opposite to the positive electrode; and
an electrolyte interposed between the positive electrode and the negative electrode.
7. A capacitor comprising:
a positive electrode capable of absorbing and desorbing anions;
a negative electrode constituted by the capacitor electrode according to claim 4, the negative electrode being disposed opposite to the positive electrode; and
an electrolyte interposed between the positive electrode and the negative electrode.
8. The capacitor electrode according to claim 1, wherein:
the average particle diameter of the primary particles of the first carbon material particles ranges from 1 μm to 10 μm, inclusive, and
the average particle diameter of the primary particles of the second carbon material particles ranges from 350 nm to 500 nm, inclusive.
9. The capacitor electrode according to claim 1, wherein:
the electrode layer further includes:
a first dispersant of cellulose or a derivative thereof; and
a second dispersant of cellulose or a derivative thereof, the second dispersant having a molecular weight smaller than a molecular weight of the first dispersant, and in the electrode layer, a content amount of the second dispersant is smaller than a content amount of the first dispersant.

10. The capacitor electrode according to claim 3, wherein:
the electrode layer further includes:
a first dispersant of cellulose or a derivative thereof; and
a second dispersant of cellulose or a derivative thereof, the second dispersant having a molecular weight smaller than a molecular weight of the first dispersant, and
in the electrode layer, a content amount of the second dispersant is smaller than a content amount of the first dispersant.

11. The capacitor electrode according to claim 8, wherein:
the electrode layer further includes:
a first dispersant of cellulose or a derivative thereof; and
a second dispersant of cellulose or a derivative thereof, the second dispersant having a molecular weight smaller than a molecular weight of the first dispersant, and
in the electrode layer, a content amount of the second dispersant is smaller than a content amount of the first dispersant.

12. The capacitor electrode according to claim 3, wherein:
the first carbon material particles are made of hard carbon, and
the second carbon material particles are made of thermal black.

13. The capacitor electrode according to claim 4, wherein:
the first carbon material particles are made of hard carbon, and
the second carbon material particles are made of thermal black.

14. The capacitor electrode according to claim 1, wherein each of the second carbon material particles has a true density equal to or smaller than 2.11 g/cm$^3$.

15. The capacitor electrode according to claim 3, wherein a content rate of the second carbon material particles with respect to the electrode layer exceeds 0 wt % and is equal to or smaller than 40 wt %.

16. The capacitor electrode according to claim 3, wherein surface roughness Rz of the electrode layer is equal to or larger than 5 µm.

17. The capacitor electrode according to claim 4, wherein:
the molecular weight of the first dispersant ranges from 500000 to 300000, inclusive, and
the molecular weight of the second dispersant ranges from 5000 to 20000, inclusive.

18. The capacitor electrode according to claim 9, wherein:
the molecular weight of the first dispersant ranges from 500000 to 300000, inclusive, and
the molecular weight of the second dispersant ranges from 5000 to 20000, inclusive.

19. The capacitor electrode according to claim 10, wherein:
the molecular weight of the first dispersant ranges from 500000 to 300000, inclusive, and
the molecular weight of the second dispersant ranges from 5000 to 20000, inclusive.

20. The capacitor electrode according to claim 11, wherein:
the molecular weight of the first dispersant ranges from 500000 to 300000, inclusive, and
the molecular weight of the second dispersant ranges from 5000 to 20000, inclusive.

* * * * *